United States Patent [19]
Yamamoto

[11] Patent Number: 5,176,201
[45] Date of Patent: Jan. 5, 1993

[54] VEHICULAR AIR CONDITIONER WITH MANUALLY OPERATED BYPASS DOOR OPERABLE ONLY IN FULL COOL MODE

[75] Inventor: Yasushi Yamamoto, Atsugi, Japan

[73] Assignee: Nissan Motor Co., Ltd., Yokohama, Japan

[21] Appl. No.: 601,920

[22] Filed: Oct. 22, 1990

[30] Foreign Application Priority Data

Oct. 26, 1989 [JP] Japan .................................. 1-279478

[51] Int. Cl.⁵ .................. B60H 3/00; F25B 29/00; F25D 17/08
[52] U.S. Cl. ........................................ 165/24; 165/42; 165/43; 236/91 E; 236/13; 454/75
[58] Field of Search ................. 165/42, 43, 24; 236/91 E, 13; 98/2.01, 2.11; 454/75

[56] References Cited

U.S. PATENT DOCUMENTS 4,478,274 10/1984 Naganoma et al. ............... 165/42
4,681,153 7/1987 Uchida ............................. 165/43

FOREIGN PATENT DOCUMENTS 0007714 1/1982 Japan ........................... 98/2.01
0083214 4/1987 Japan ............................ 98/211

Primary Examiner—John K. Ford
Attorney, Agent, or Firm—Foley & Lardner

[57] ABSTRACT

An automatic air conditioner for an automotive vehicle is arranged to be controlled by a control system and comprised of a heater unit disposed within an air conditioner duct to heat air inducted through an air inlet. A bypass air passage is provided to fluidly connect a first duct part upstream of the heater unit and a second duct part downstream of the heater unit, so that cool air can be introduced to the second duct part immediately upstream of an air outlet having a plurality of outlet openings. The bypass air passage is closable with a door movably disposed in the bypass air passage. The door is closed in response to a closing command generated by a manual switch. The control system is adapted to close the bypass air passage regardless of generation of the closing command when at least an air outlet for air-conditioning a passenger compartment is selected, thereby preventing temperatures of air streams blown out through a plurality of outlet openings of the air outlet from becoming nonuniform.

9 Claims, 6 Drawing Sheets

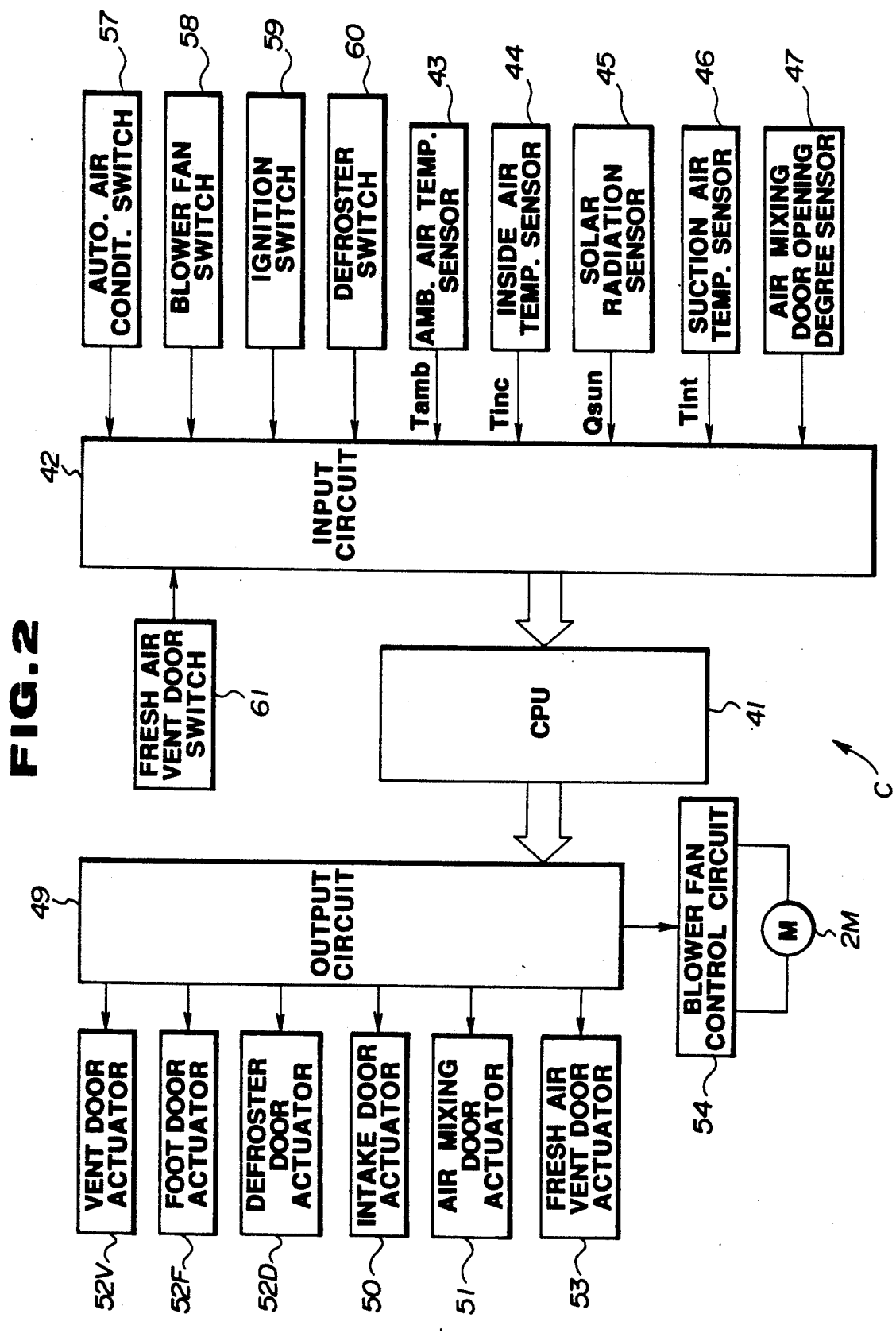

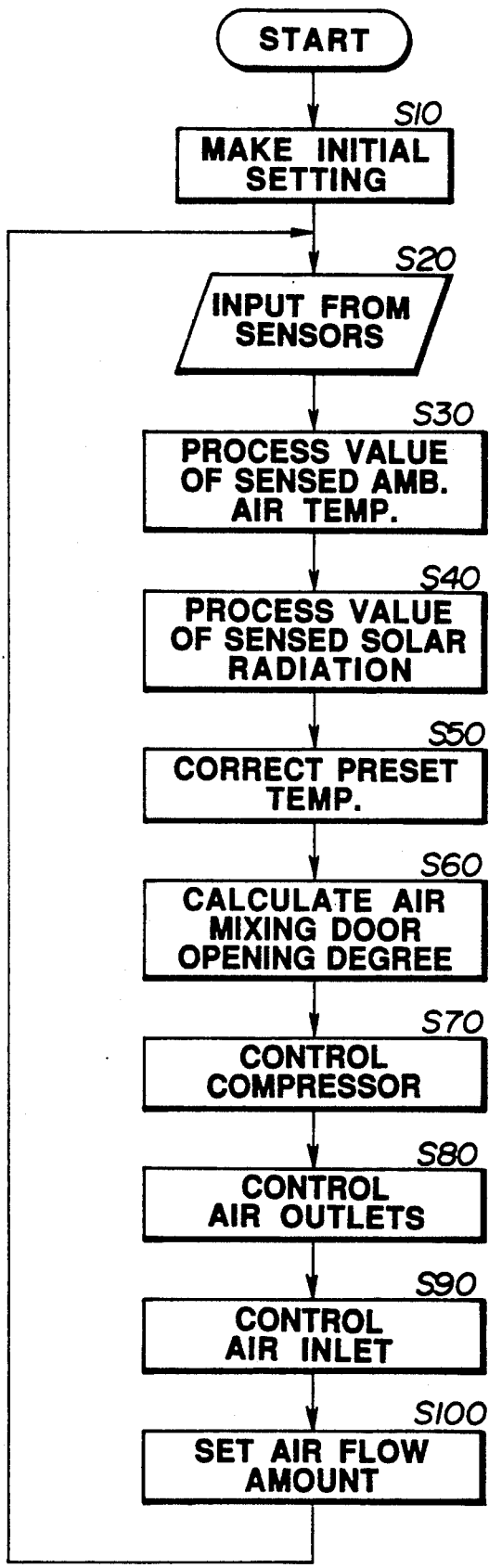

VEHICULAR AIR CONDITIONER WITH MANUALLY OPERATED BYPASS DOOR OPERABLE ONLY IN FULL COOL MODE

BACKGROUND OF THE INVENTION

1. Field of the Invention

This invention relates to improvements in a vehicular air conditioner of the type wherein cool air is introduced to air outlets through a passage bypassing a heater unit.

2. Description of the Prior Art

A variety of air conditioners for an automotive vehicle have been proposed and put into practical use. An example of such air conditioners is arranged as follows: The air conditioner includes an air conditioner duct in which a heater unit is disposed to heat air inducted into the duct. The duct is provided with air outlet openings opening into a passenger compartment of the vehicle. A bypass air passage is provided to connect upstream and downstream parts of the inside of the duct. The upstream part is located upstream of the heater unit, while the downstream part is located downstream of the heater unit. Accordingly, cool air not heated is introduced to the downstream part through the bypass air passage, bypassing the heater unit. Additionally, an air mixing door is controllably movably disposed near the heater unit and between the upstream and downstream parts in order to control the amount of air flow passing through the heater unit.

When the air mixing door is opened to supply air heated by the heater unit to the air outlet openings, and the bypass air passage is opened by opening a door movably disposed in the bypass air passage, the cool air will be introduced to the downstream part of the duct to be mixed with hot air heated by the heater unit. However, in this downstream part of the duct, insufficient mixing of cool air and hot air occurs. As a result, temperatures of air streams blown out through a plurality of air outlet openings become nonuniform, and the temperatures are caused to drop.

SUMMARY OF THE INVENTION

It is an object of the present invention to provide an improved vehicular air conditioner which overcomes difficulties encountered in a conventional vehicular air conditioner of the type wherein a bypass air passage is formed for bypassing a heater unit so that cool air is introduced at a location downstream of the heater unit and upstream of air, outlet openings.

Another object of the present invention is to provide an improved air conditioner which prevents temperatures of air streams blown out through respective air outlet openings from becoming nonuniform, and avoids dropping of the temperatures of the blown-out air.

A first aspect of the present invention is schematically illustrated in FIG. 6 and resides in a vehicular air conditioner comprised of heating means 4' for heating air inducted through an air inlet in accordance with a selected temperature. A bypass air passage 6 is provided to communicate with the air inlet and bypass the heating means 4'. Opening and closing means 10' opens and closes the bypass air passage upon receipt of opening and closing commands respectively. Commanding means 61 generates the opening and closing commands. Air outlet selecting means 52 provides means for selecting at least one of a plurality of air outlets including first and second outlets. Additionally, bypass air passage control means 40 for closes the bypass air passage regardless of generation of the opening command when at least the first air outlet is selected.

Another aspect of the present invention is schematically illustrated in FIG. 7 and resides in the vehicular air conditioner comprised of automatic air conditioning control means 40A for automatically generating a command to select at least one of a plurality of air outlets including first and second air outlets and a temperature of air blown out through the air outlets in accordance with vehicular thermal loads. Cooling means 3' is provided to cool air inducted through an air inlet. Heating means 4' is provided to heat air inducted through the air inlet in accordance with the selected temperature of the blown-out air. A bypass air passage 6 is provided to communicate with the air inlet and bypass the heating means. Opening and closing means 10' is provided to open and close the bypass air passage, respectively, when receiving opening and closing commands. Commanding means 61 is provided to generate the opening and closing commands. Bypass air passage control means 40B is provided to close the bypass air passage regardless of generation of the opening command when at least said first air outlet is selected by said automatic air conditioning control means.

According to the above present invention, when the first air outlet is selected, the opening and closing means 10' maintains a closed condition in the bypass air passage 6 even if the opening command is generated in the commanding means 61. Therefore, cool air passing through the bypass air passage 6 is not introduced into a location immediately upstream of the air outlet 7. As a result, temperatures of air streams blown out through a plurality of outlet openings of the air outlet 7 are prevented from becoming nonuniform and a temperature drop of the blown-out air streams is avoided.

BRIEF DESCRIPTION OF THE DRAWINGS

In the drawings, like reference numerals designate like parts and elements throughout the figures, in which:

FIG. 2 is a block diagram of a control system for the air conditioner of FIG. 1;

FIG. 3 is a flowchart showing a program of a basic control procedure of the control system of FIG. 2;

DETAILED DESCRIPTION OF THE INVENTION

Figure 1:
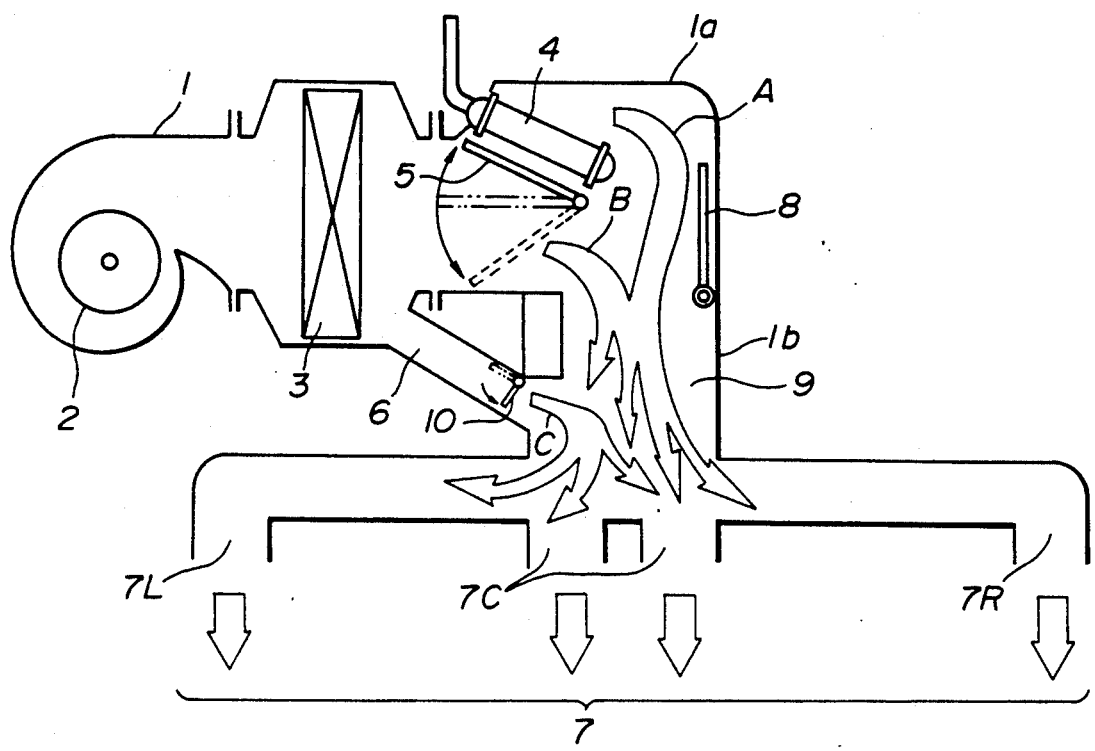
FIG. 1 is a schematic illustration of an embodiment of a vehicular air conditioner.

Referring now to FIG. 1, there is shown a first embodiment of an air conditioner for an automotive vehicle, in accordance with the present invention. The air conditioner comprises an air conditioner duct 1. A blower fan 2 is provided in the duct 1 to induct air into the duct 1 through an air inlet (not shown) formed near the blower fan 2. An evaporator 3 forming part of an air conditioner refrigeration system is provided in the duct 1 to cool air inducted into the duct 1. A heater unit 4 is provided in the duct 1 to heat air inducted in the duct 1. An air mixing door 5 is pivotally movably disposed in the duct 1 to control mixing of cool air and warm air heated by the heater unit 4. A fresh air vent passage 6 is provided to bypass a duct part 1a in which the heater unit 4 and the mixing door 5 are disposed. The air conditioner duct 1 communicates with an air outlet 7 having center air outlet opening 7C and side air outlet openings 7L, 7R. A vent door 8 is pivotally movably disposed in the duct 1 and in the vicinity of the duct part 1a. The vent door 8 is arranged to control air blowing through the air outlet 7. The fresh air vent passage 6 is adapted to intake air downstream of the evaporator 3 to a passage 9 formed inside a duct part 1b. The duct part 1b is connected with the duct part 1a so that the duct part 1a communicates with the passage 1b. It will be understood that a duct inside portion upstream of the air mixing door 5 is directly communicable with the passage 1b. A fresh air vent door 10 is pivotally movably disposed in the fresh air vent passage 6 to control the amount of air passing through the fresh air flow vent passage 6. It is to be noted that the opening degree of the above-mentioned air mixing door 5, the vent door 8, and the fresh air vent door 10 are controlled, respectively, by an air mixing door actuator 51, a vent door actuator 52V and a fresh air vent door actuator 53 which will be discussed below.

In FIG. 1, air A heated by the heater unit 4 is mixed with air B which is not heated. The mixed air is further mixed with air C which is also not heated and is introduced through the fresh air vent passage 6. The thusly mixed air is blown out into a passenger compartment (not shown) through the air outlet openings 7C, 7L, 7R.

An example of a control system C for controlling the air conditioner is illustrated in FIG. 2. The control system C comprises a CPU 41 to which an ambient air temperature sensor 43, an inside air temperature sensor 44, a solar radiation sensor 45, a suction air temperature sensor 46, and an air mixing door opening degree sensor 47 are electrically connected through an input circuit 42. The ambient air temperature sensor 43 is adapted to detect ambient air temperature (the temperature of air outside the vehicle), Tamb. The inside air temperature sensor 44 is adapted to detect a temperature Tinc of air in a passenger compartment. The solar radiation sensor 45 is adapted to detect a quantity Qsun of solar radiation. The quantity Qsun of solar radiation may be measured as an amount of light. The suction air temperature sensor 46 is adapted to detect an air temperature Tint downstream of the evaporator 4. The air mixing door opening degree sensor 47 is adapted to detect an opening degree of the air mixing door 5. Accordingly, such temperature information and heat quantity information are input to the CPU 41.

Additionally, an automatic air conditioning switch 57, a blower fan switch 58, an ignition switch 59, a defroster switch 60, and a fresh air vent door switch 61 are electrically connected with the input circuit 42. The automatic air conditioning switch 57 is adapted to be switched ON to start an automatic air conditioning. The blower fan switch 58 is adapted to be switched ON to operate the blower fan 2. The ignition switch 59 is adapted to be switched ON to operate an ignition system (not shown) of an internal combustion engine mounted on the vehicle. The defroster switch 60 is adapted to be switched ON to operate a defroster (not shown). The fresh air vent door switch 61 is adapted to be manually switched ON and OFF to command opening and closing actions of the fresh air vent door 10. In other words, the fresh air vent door switch 61 generates opening and closing command signals which cause the fresh air vent door 10 to open and close, respectively.

An intake door actuator 50, the air mixing door actuator 51, the vent door actuator 52V, a foot door actuator 52F, a defroster door actuator 52D, the fresh air vent door actuator 53, and a blower fan control circuit 54 are electrically connected through an output circuit 49 with the CPU. The intake door actuator 50 is adapted to control the position of an air intake door (not shown) through which one of the outside air (air outside the passenger compartment) and the inside air (air within the passenger compartment) is selectively sucked into the duct 1 under the suction of the blower fan 2. The foot door actuator 52F is adapted to control the opening degree of a foot door (not shown) through which air from the duct 1 is blown out to a part (at which the feet of a passenger are located) of the passenger compartment of the vehicle. The defroster actuator 52D is adapted to control the opening degree of a defroster door (not shown) through which air from the duct 1 is blown out to a defroster (not shown). The blower fan control circuit 54 is adapted to control the rotational speed of a blower fan motor 2M to which the blower fan 2 is drivably connected.

The CPU 41 is arranged to controllably operate the actuators such as the air mixing door actuator 51 and the fresh air vent door actuator 53 in response to the information input from the sensors 43 to 47 and the switches 57 to 61, thereby to suitably control the amount of intake air and blown-out air and the temperature of the blown-out air. An air flow amount control signal is supplied to the CPU 41 to control the blower fan motor 2M so as to regulate an air flow amount generated by the blower fan 2.

A basic control procedure of the air conditioner control system C will be discussed with reference to a flowchart in FIG. 3. The basic control procedure is accomplished by the CPU 41.

At a step S10, an initial setting is carried out in which, for example, a preset temperature Tptc within the passenger compartment is initially set at 25° C in a normal automatic air conditioning mode. At a step S20, a variety of information is are input from the sensors.

Input of data information from the respective sensors will be explained in detail. The information of the preset temperature Tptc is supplied from a control panel (not shown). The information of the inside temperature (within the passenger compartment) Tinc is supplied from the inside air temperature sensor 44. The information of the ambient air temperature is supplied from the ambient temperature sensor 43. The information of the suction air temperature Tint is supplied from the suction air temperature sensor 46. The information of the quantity Qsun of the solar radiation is supplied from the solar radiation sensor 45. The information of the opening degree of the air mixing door 5 is supplied from the air mixing door opening degree sensor 47.

At a step S30, the information of the ambient air temperature Tamb from the ambient air temperature sensor 43 is processed to obtain a value Tam corresponding to an actual ambient air obtained by removing thermal influences due to other heat sources. At a step S40, the information of the quantity of solar radiation as the amount of light is processed to obtain a value Q'sun of the quantity of heat which is suitable for a calculation which will be accomplished thereafter. At a step S50, the target temperature Tptc set in the control panel is processed to be corrected in accordance with the ambient air temperature thereby obtaining a corrected value T′ptc. At a step S60, a target blown-out air temperature To of air blown out from the air outlet openings 7C, 7L, 7R is calculated in accordance with the values T′ptc, Tinc, Tam and Q′sun. Additionally, the opening degree of the air mixing door 5 is calculated in accordance with a deviation of an actual temperature of air blown out through the air outlet openings 7C, 7L, 7R from the target blown-out air temperature To. At a step S70, a command is made to switch ON or OFF a compressor (not shown) which forms part of the air conditioning refrigeration system and is fluidly connected with the evaporator 3. At a step S80, a control command is made for the air outlets including outlet 7. At a step S90, a control command for the intake door is made to select between a first state in which an outside air inlet (not shown) is opened to induct the outside air and a second state in which an inside air inlet (not shown) is opened to induct the inside air. At a step S100, a control command is made for the blower fan motor 2M so as to control the air flow amount at the air outlets.

Figure 4:
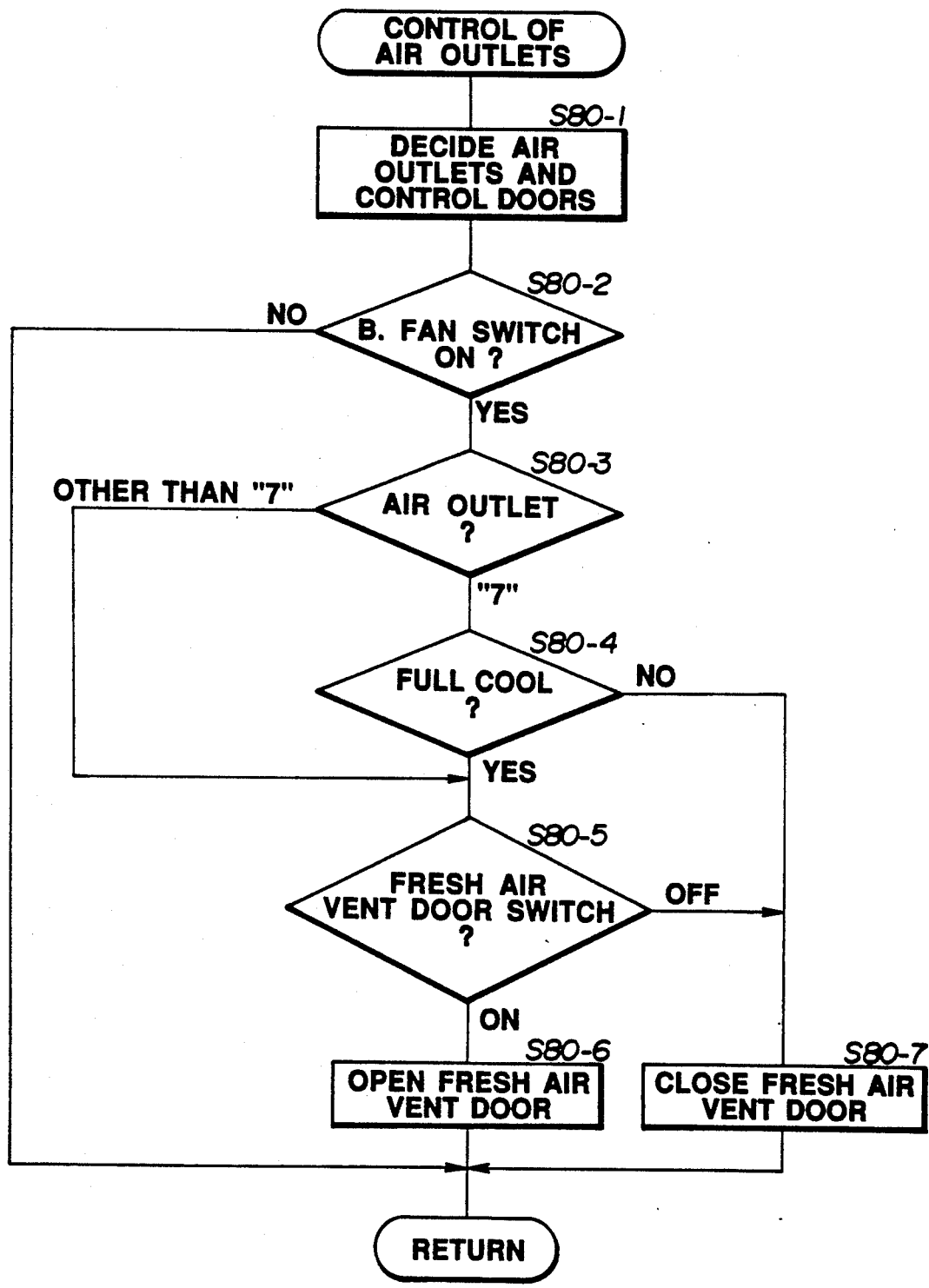
FIG. 4 is a flowchart showing a program of an auxiliary control procedure of the control system of FIG. 2.
Figure 6:
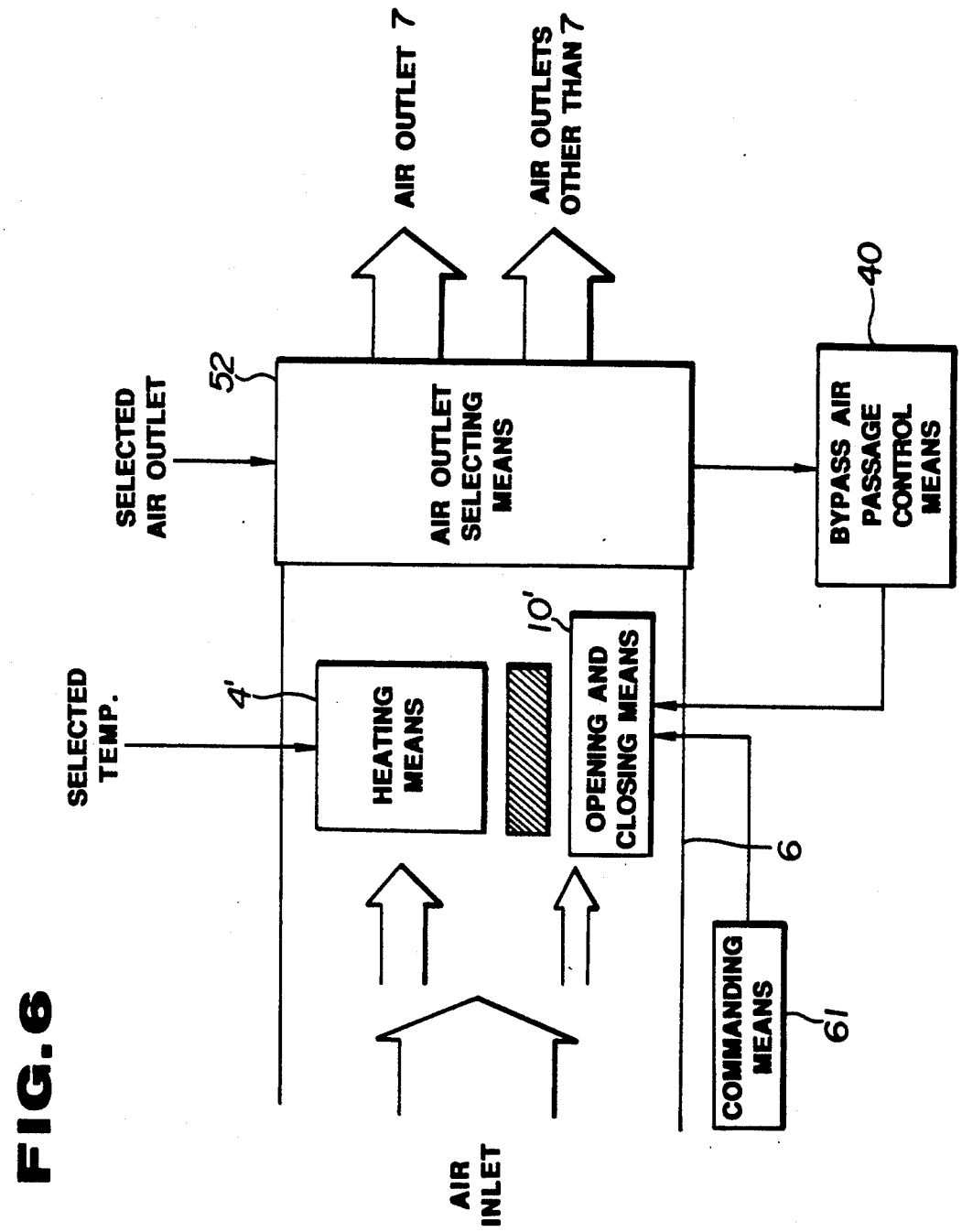
FIG. 6 is a block diagram of one embodiment of the present invention.
Figure 7:
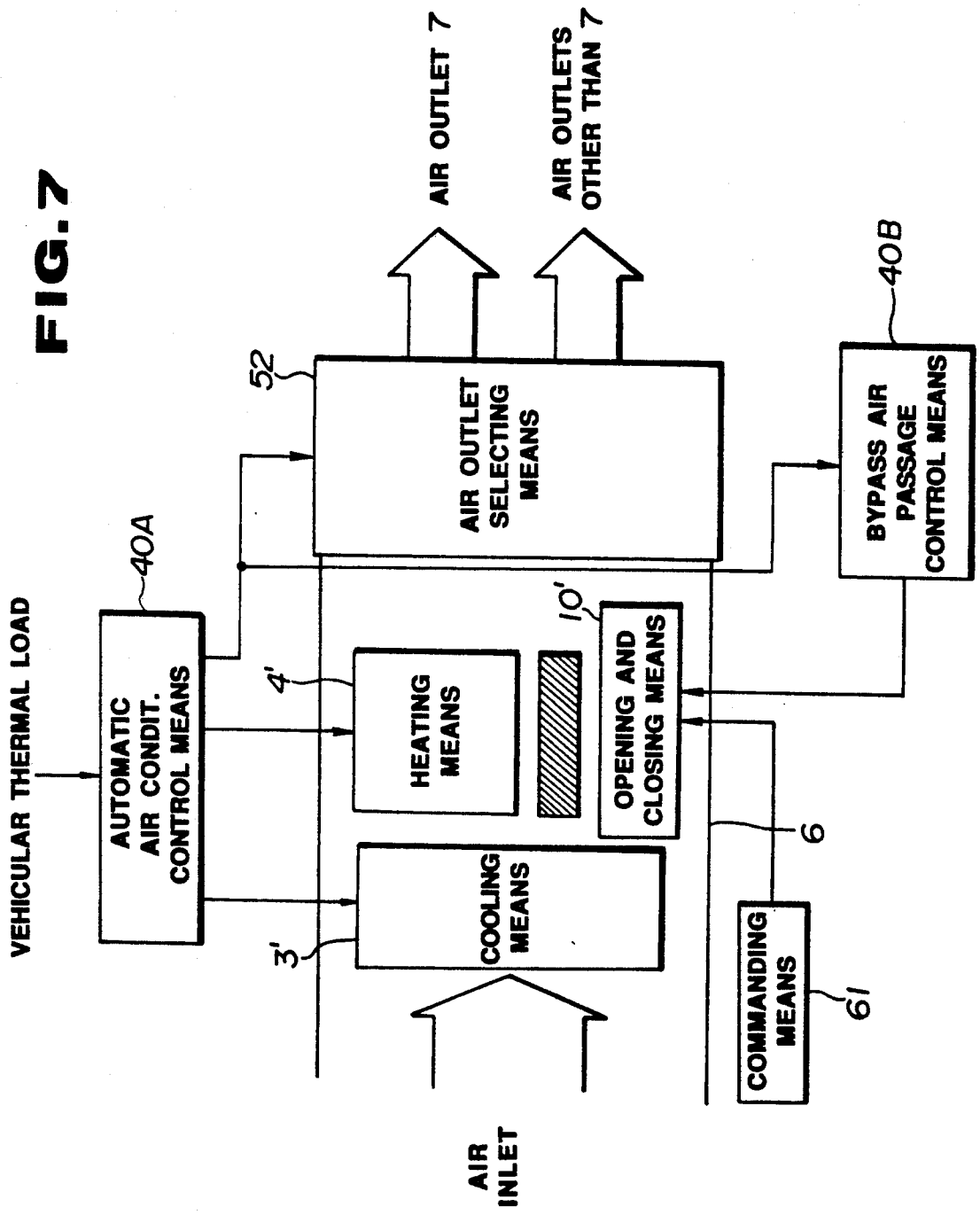
FIG. 7 is a block diagram of another embodiment of the prevent invention.

The above-mentioned step S80 for control of the air outlets will be discussed in detail with reference to the flowchart of FIG. 4.

At a step S80-1, in accordance with the target blown-out air temperature To, the air outlets through which air is to be blown out are selected, and the actuators corresponding to the selected air outlets are operated. At step S80-2, a determination is made as to whether the blower fan switch 58 is switched ON or not. If switched ON, a determination is made as to whether the selected air outlet is outlet 7 or not, at a step S80-3. This determination depends on the decision at the step S80-1. If that the decision of the air outlets can be made manually by the passenger's indication, then the above-mentioned decision of the air outlets in step S80-1 may be controlled by the passenger's indication. When the air outlet is determined to be outlet 7 at the step S80-3, a determination is made as to whether a condition is a "full cool" or not at a step S80-4. The "full cool" conditioned a condition in which the opening degree of the air mixing door 5 is the minimum so that all the whole air passing through the evaporator 3 flows to the downstream side of the heater unit 4 without contacting the heater unit 4. When the condition is the "full cool", the control goes to a step S80-5 at which a determination is made as to whether the fresh air vent door switch 61 is switched ON or OFF. When switched ON, the fresh air vent door actuator 53 is operated to open the fresh air vent door 10 at a step S80-6. When switched OFF, the fresh air vent door 10 is closed at a step S80-7.

When the determination is so made that the condition is not "full cool" in step S80-4, the control goes to the step S80-7 in which the fresh air vent door 10 is closed. If the determination is so made that the air outlet is not outlet 7, the control goes to the step S80-5 without passing through the step S80-4. After performing the steps S80-6 and S80-7, or when the blower fan switch 58 is determination to be not ON at the step S80-2, the control goes to a "return" and goes back to a predetermined procedure in the flowchart of FIG. 3.

According to the above-discussed control procedure, in case of the condition of selecting the air outlet 7 and not the "full cool" condition, the control does not pass through the step S80-5. Accordingly, the fresh air vent door 10 cannot be opened even if the fresh air vent switch 61 is switched ON. Also, if the above condition is established when the fresh air vent door 10 is open, the fresh air vent door 10 will be closed. As a result, under such a condition in which the fresh air vent door 10 is closed, the air C indicated in FIG. 1 is not introduced into the passage 9 downstream of the vent door 8, so that the temperatures of air streams blown out through the air outlet openings 7C, 7L, 7R are prevented from becoming nonuniform. Furthermore, even when the air outlet 7 (7C, 7L, 7R) is selected, and the condition is "full cool", the control goes to the step S80-6 by switching ON the fresh air vent switch 61 and therefore the fresh air vent door 10 can be opened. In case the air outlets other than that 7 (7C, 7L, 7R) are selected, the control goes from the step S80-3 to the step S80-5 and therefore the fresh air vent door 10 can be opened and closed regardless of the opening degree of the air mixing door 5.

The above discussed air conditioner is a so-called automatic air conditioner wherein a desired temperature of air blown through the air outlets is obtained in accordance with a preset temperature Tptc of the air blown through the air outlets and a variety of vehicular thermal loads.

Figure 5:
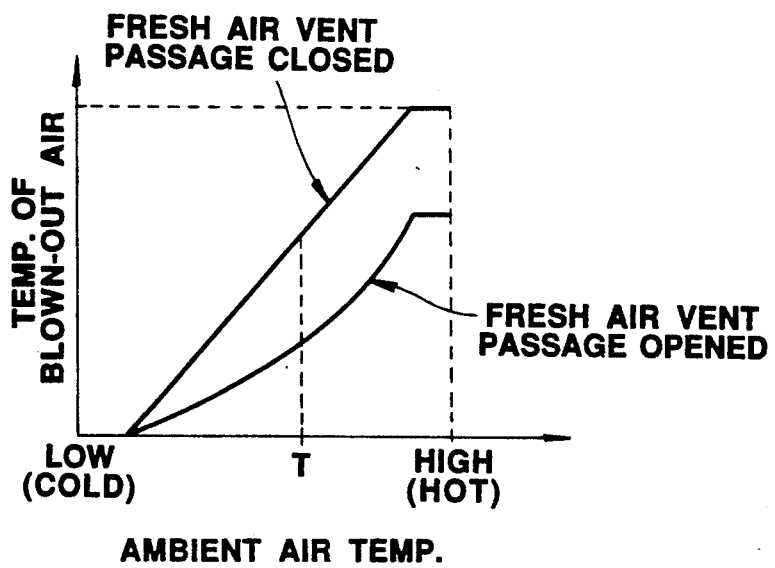
FIG. 5 is a graph illustrating a problem encountered in a conventional automatic air conditioner similar to the air conditioner of the present invention.

It is to be noted that if a conventional automatic air conditioner were to also have the same structure as that shown in FIG. 1, if the fresh air vent passage 6 is opened in conditions other than "full cool", then temperature of air blown out through the air outlet openings is lowered as compared with the case in which the fresh air vent passage 6 is closed. See the experimental data in FIG. 5. Additionally, particularly at an ambient temperature T indicated in FIG. 5, the temperatures of air streams blown through the respective air outlet openings 7C, 7L, 7R become nonuniform.

However, according to the above-discussed embodiment in which the fresh air vent passage 6 cannot be opened in conditions other than "full cool", air streams having a preset temperature can be blown out through the air outlet openings 7C, 7L, 7R, while preventing the temperatures of the respective air streams from becoming nonuniform. Furthermore, employment of the control procedure of this embodiment makes it unnecessary to form a complicated program whereby the opening degree of the air mixing door (5) is regulated in accordance with the opening and closing actions of the fresh air vent door (10), in order to obtain a desired blown-out air temperature.

While the air conditioner according to the present invention has been shown and described as having the evaporator 3 and the heater unit 4, it will be understood that the principle of the present invention may be applied to an air conditioner for only a heating purpose, having no evaporator. In this case, the fresh air vent door is arranged to be closed at least when the air outlet 7 (7C, 7L, 7R) is selected, so that the temperatures of respective air streams blown out through a plurality of air outlet openings are prevented from becoming nonuniform under a condition in which the air outlet 7 is selected while the air mixing door is in a state other than a fully closed state.

What is claimed is:

1. A vehicular air conditioner comprising:
   automatic air conditioning control means for automatically generating a command to select at least one of a plurality of air outlets including first and second air outlets and a temperature of air blown out through said air outlets in accordance with vehicular thermal loads;

means for cooling air inducted through an air inlet;

means for heating air inducted through said air inlet in accordance with said selected temperature of the blown-out air;

means for forming a first bypass air passage which communicates with said air inlet and which bypasses said heating means;

means for forming a second bypass air passage which communicates with said air inlet and bypasses said heating means, said second bypass air passage being opened to a first position nearer to said first air outlet than a second position at which said first bypass air passage is opened;

means for opening and closing said second bypass air passage respectively when receiving opening and closing commands;

means for generating said opening and closing commands;

means for selecting at least one of said air outlets including said first and second air outlets in response to said command of said automatic air conditioning control means; and means for closing said second bypass air passage regardless of generation of said opening command when at least said first air outlet is selected by said automatic air conditioning control means to supply air into a passenger compartment, and under a condition other than a full cool condition; wherein the means for opening said second bypass air passage is operable when at least said first air outlet is selected by said automatic air conditioning control means to supply cool air into said passenger compartment under said full cool condition.

2. A vehicular air conditioner as claimed in claim 1, wherein said first air outlet is opened to a passenger compartment to accomplish air conditioning around a passenger.

3. A vehicular air conditioner as claimed in claim 1, wherein said first air outlet further comprises a plurality of air outlet openings which are separate from each other.

4. A vehicular air conditioner as claimed in claim 1, wherein said second bypass air passage is formed such that air inducted through said air inlet is directly supplied to a passage which is located downstream of said heating means and upstream of said first air outlet.

5. A vehicular air conditioner as claimed in claim 1, further comprising an air conditioner duct having a first end section formed with said air inlet, and a second end section formed with at least said first air outlets.

6. A vehicular air conditioner as claimed in claim 5, wherein said heating means includes a heating unit disposed within said duct downstream of said air inlet.

7. A vehicular air conditioner as claimed in claim 6, wherein said second bypass air passage forming means includes means forming a fresh air vent passage which fluidly connects first and second parts inside of said duct, said first part being downstream of said air inlet and upstream of said heating unit, said second part being downstream of said heating unit and upstream of said first air outlet.

8. A vehicular air conditioner as claimed in claim 7, wherein said opening and closing means includes a fresh air vent door which is movably disposed in said second bypass air passage to open and close the second bypass air passage respectively when opened and closed.

9. A vehicular air conditioner as claimed in claim 8, wherein said opening and closing commands generating means includes a switch for causing said fresh air vent door to open and close.

* * * * *